US006970724B2

(12) United States Patent
Leung

(10) Patent No.: US 6,970,724 B2
(45) Date of Patent: Nov. 29, 2005

(54) APPARATUS AND METHOD FOR AUTOMATICALLY DISABLING CELL PHONE RINGING

(75) Inventor: Sui-hing Leung, Cupertino, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 551 days.

(21) Appl. No.: 09/928,206

(22) Filed: Aug. 10, 2001

(65) Prior Publication Data

US 2003/0032457 A1 Feb. 13, 2003

(51) Int. Cl.$^7$ .................................................. H04B 1/38
(52) U.S. Cl. ................ 455/567; 455/404.1; 455/404.2; 455/63; 455/76.1; 455/561; 455/421; 455/518; 455/70; 455/63.1; 455/63.2; 455/63.3; 455/63.4; 455/565; 455/412.1; 455/414.1; 375/130
(58) Field of Search ................................ 455/562, 804, 455/63, 261, 561, 421, 518, 20, 63.1, 63.2, 455/63.3, 63.4, 565, 414.1, 412.1; 325/130

(56) References Cited

U.S. PATENT DOCUMENTS 6,343,212 B1 * 1/2002 Weber et al. ............. 455/404.1
6,496,531 B1 * 12/2002 Kamel et al. ................ 375/130

FOREIGN PATENT DOCUMENTS

EP        1035747 A        9/2000
EP        1041847 A        10/2000

* cited by examiner

Primary Examiner—Joseph Feild
Assistant Examiner—David Nguyen

(57) ABSTRACT

The present invention pertains to an apparatus and method for automatically disabling cell phone ringing and/or cell phone beeping. An RF transmitter is used to transmit an RF non-audible mode or control signal. Upon receiving the non-audible mode or control signal, the cell phone and/or beeper automatically disables its audible alarm. Users are notified of incoming calls and/or pages by means of blinking lights or vibration. When the user no longer receives the non-audible mode or control signal or upon the elapse of a fixed, pre-determined amount of time, the cell phone and/or beeper automatically reverts back to its normal mode of operation whereby incoming calls and pages are indicated by cell phone ringing and pager beeping.

12 Claims, 5 Drawing Sheets

APPARATUS AND METHOD FOR AUTOMATICALLY DISABLING CELL PHONE RINGING

TECHNICAL FIELD

The present invention relates to the field of cellular telephones. More specifically, the present invention pertains to an apparatus and method for selectively disabling audible cell phone ringing.

BACKGROUND ART

Cellular phones have gained widespread acceptance because they are just as easy to use as traditional telephone sets to which people have become familiar to use. When dialing out, a person simply enters the telephone number by depressing the numbered buttons on the cellular phone. Rather than connecting via twisted pair wires, the cellular phone transmits its signals over-the-air. Upon receiving a phone call, the cellular phone would audibly "ring" to notify the recipient of the incoming call. The recipient can then answer the call and talk to the caller via wireless radio frequency (RF) communications.

Due to the mobile flexibility offered by cellular phones and the convenience of being able to make a call or being able to be contacted virtually anywhere, people are taking their cellular phones along with them wherever they may go. One side-effect is that cellular phones can firing at inopportune times. For instance, a cellular phone may ring during a concert performance, a play, a conference, a meeting, or dinner at an upscale restaurant. At best, these occurrences are embarrassing to the user and annoying to others around them. However, more and more people are buying and subscribing to cellular phone services as prices for the handsets and monthly service fees continue to drop. This increased proliferation of cellular phones has exacerbated the distractions resulting from audible ringing of cellular phones. In the past, a single case of a cell phone ringing might pose a minor irritation; but now, with multiple cell phones regularly ringing whenever there are large congregations of people, this problem is becoming a major, intolerable nuisance.

In view of the potential distraction imposed by audible ringing, cell phone manufacturers have added non-audible notification features. For example, some cell phone models have a vibration feature. A user can disable the audible ringing and elect the vibration function. The cell phone notifies the user of an incoming call by vibrating. Alternatively, the user can be notified by a blinking light.

Unfortunately, not everyone is diligent enough or remembers to deactivate the audible ringing of their cellular phones when appropriate. Additionally, it is an inconvenience to the user to physically activate and then subsequently reactivate their cell phone's audible ringing.

Therefore, there exists a need in the art for an apparatus or method for selectively activating and deactivating the ringing of cell phones under appropriate circumstances. The present invention provides a unique, novel solution to the problems discussed above.

DISCLOSURE OF THE INVENTION

The present invention pertains to an apparatus and method for automatically disabling cell phone ringing. In a normal mode of operation, the user is notified of an incoming call by an audible alarm, such as a cell phone ringing. However, in the present invention, an RF transmitter is used to transmit a non-audible mode or control signal over-the-air. Upon receiving the non-audible mode or control signal, the cell phone is automatically placed in a non-audible mode or control of operation. This entails automatically disabling its audible alarm and automatically enabling one or more non-audible alarms. In the non-audible mode or control of operation, the user is notified of incoming calls by means of blinking lights or vibration. Thereby, annoying cell phone ringing can be automatically eliminated for those events which require silence.

This silent mode of operation can selectively be controlled. In one embodiment, the cell phone is placed back to its normal mode of operation when the user no longer receives the non-audible mode or control signal. When the event ends, the transmitter stops broadcasting its non-audible signal. Alternatively, if the user leaves the event, the cell phone is moved beyond the range of receiving the non-audible mode or control signal. Thereupon, the cell phone automatically reverts back to its normal mode of operation. In another embodiment, the cell phone is placed back to its normal mode of operation upon the elapse of a fixed, pre-determined amount of time. For instance, the cell phone reverts back to its normal mode of operation after an event ends.

In another embodiment of the present invention, pagers are automatically placed in a non-audible mode or control of operation when they receive an RF non-audible mode or control signal. When a pager receives the RF non-audible mode or control signal, the user is notified of incoming pages by silent means, such as a blinking light or by virtue of vibration. The pager is automatically placed back to its normal mode of operation if it no longer receives the RF non-audible mode or control signal or alternatively if a fixed, pre-determined amount of time has elapsed.

BRIEF DESCRIPTION OF THE DRAWINGS

The accompanying drawings, which are incorporated in and form a part of this specification, illustrate embodiments of the invention and, together with the description, serve to explain the principles of the invention.

BEST MODE FOR CARRYING OUT THE INVENTION

The present invention of an apparatus and method for selectively disabling audible cell phone ringing is herein disclosed. In the following detailed description of the present invention, numerous specific details are set forth in order to provide a thorough understanding of the present invention. However, it will be obvious to one skilled in the art that the present invention may be practiced without these specific details or by using alternate elements or methods. In other instances well known methods, procedures, components, and circuits have not been described in detail as not to unnecessarily obscure aspects of the present invention.

Figure 1:
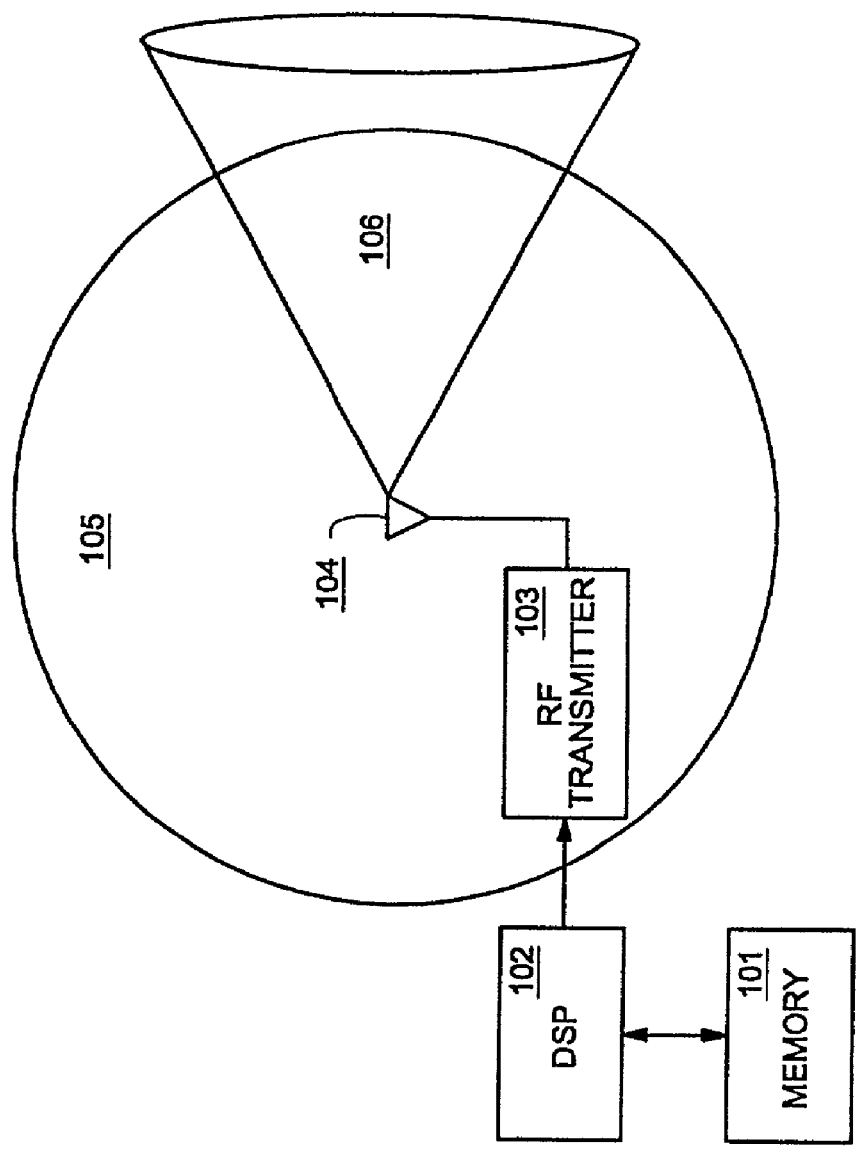
FIG. 1 shows a block diagram of a system for disabling audible cell phone ringing.

FIG. 1 shows a block diagram of a system for disabling audible cell phone ringing. Memory 101 is comprised of non-volatile memory (e.g., read-only memory, FLASH memory, etc.). A set of codes is stored in memory 101. Software instructions pertaining to various features of the system are also stored in memory 101. Some features may include which codes are to be used under what circumstances, the duration of silence, the times when codes are to be broadcast, the duration of a broadcast, the transmit signal strength, etc. The system can be customized to meet a wide variety of different needs whereby it might be important to automatically disable the audible notification of cell phones. A digital signal processor 102 processes the codes according to the software program. A radio frequency (RF) transmitter 101 is used to broadcast the appropriate code(s) over-the-air. In one embodiment, the codes are transmitted as part of a preamble used to identify particular cell phones. It is contemplated that transmitting system be a small, lightweight, compact, integrated unit such that it can readily be unobtrusively mounted in a fixed setting, such as restaurants, concert halls, or conference rooms.

Any cell phone which is adapted to receive the codes are then automatically programmed to switch to a silent mode of operation. A silent mode of operation entails turning off any audible notification of incoming calls, such as ringing, beeping, chirping, etc. In addition, one or more inaudible notification mechanisms are automatically enabled. For instance, a vibration mechanism can be used to notify a cell phone user of an incoming call. Alternatively, a blinking light source can be activated to signal an incoming call.

The antenna 104 can either be an omni-directional antenna or a directional antenna. In an omni-directional antenna, any cell phones within the omni broadcast range 105 of the antenna will automatically be switched to a silent mode of operation upon receiving the appropriate code. For example, an omni-directional antenna may be employed during an outdoor wedding ceremony or an outdoor concert. The transmitter would be placed in the proximate middle of the audience and would broadcast the appropriate codes continuously. The cell phones of attendees falling within the broadcast of the transmitter would automatically be switched to a silent mode of operation. As soon as an attendee leaves the vicinity of the broadcast, his or her cell phone is then automatically revert back to the audio mode of incoming call notification.

In an alternative embodiment, the antenna can be directional. Only those cell phones within the beam 106 of the directional antenna will receive the codes. An examples of where a directional antenna might find use include theaters. The beam could be placed at the entrance to a theater, such as where tickets are collected. As a person passes through the ticket collector, their cell phone would fall within the tight beam of the transmitter. Consequently, their cell phone could be programmed to automatically switch to a silent mode of operation for a pre-determined amount of time, such as the duration of the movie or play. Upon the elapse of this pre-determined amount of time, the cell phones would then automatically revert back to an audible notification of incoming calls. The cell phone user also has the ability to manually revert back to the audio mode at any time, should the user leave the event prematurely.

Figure 2:
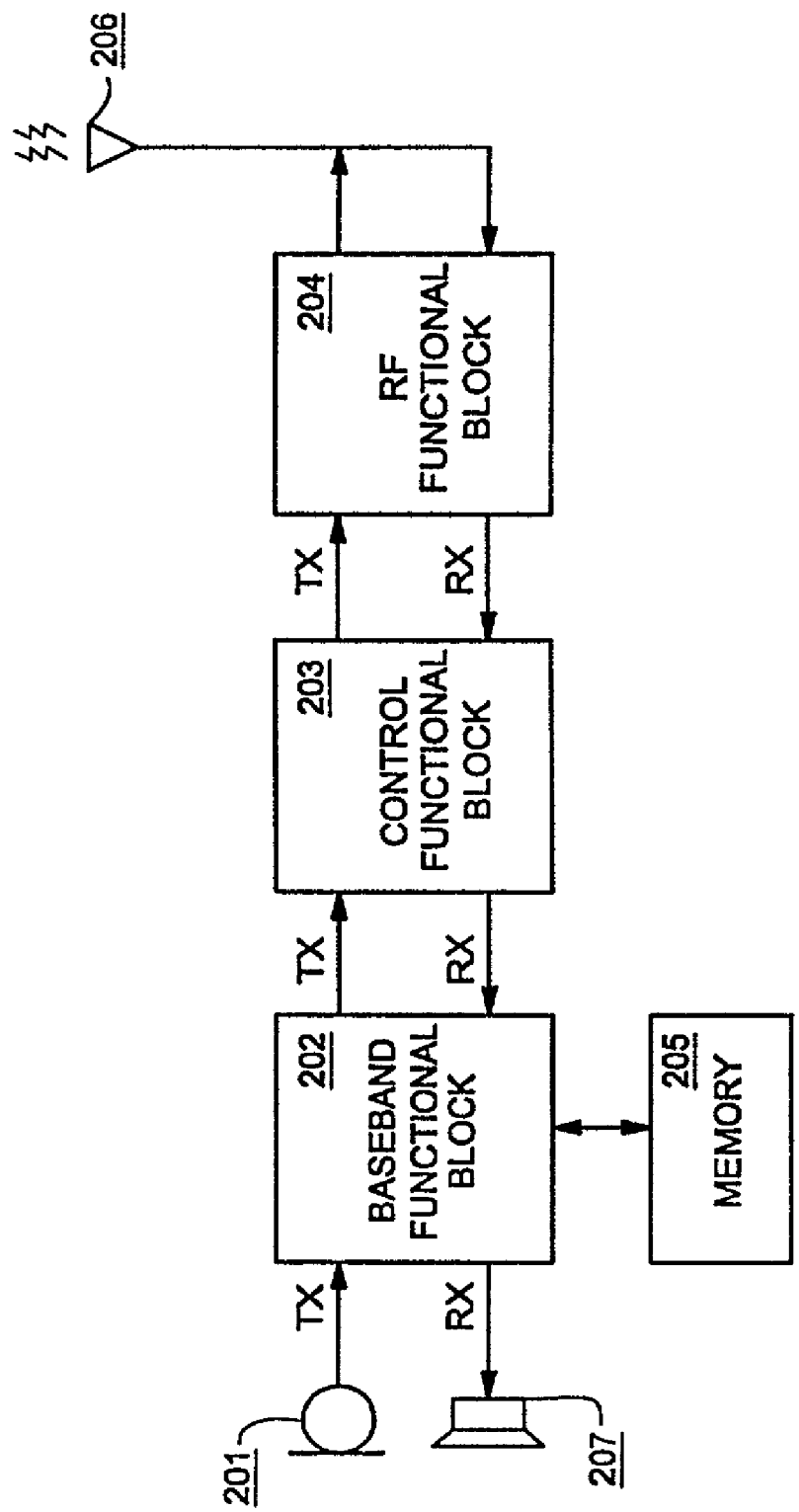
FIG. 2 shows a block diagram of an exemplary cell phone upon which the present invention may be practiced.

FIG. 2 shows a block diagram of an exemplary cell phone upon which the present invention may be practiced. The cell phone comprises a microphone 201 for accepting voice data from the user. An application specific integrated circuit (ASIC) chip 202 is used for baseband processing. The control functions are handled by a digital signal processor (DSP) 203. The RF unit 204 is a radio frequency transceiver. And memory 205 is used to store data, software, and codes. Memory 205 could be embedded into the signal processor or reside in an external FLASH, PROM, ROM, or SRAM chip(s).

When the cell phone is in its normal mode of operation, an incoming call is received by antenna 206. The call is detected by the control functional block 203, and an audible signal is generated for output on speaker 207. If a code signifying a non-audible mode or control of operation is received by antenna 206, the control function block consults memory 205 to determine the corresponding course of action. Typically, this will entail temporarily disabling the audio alarm feature. In other words, an audible signal to the speaker will not be generated. Instead, a non-audible notification signal will be generated.

Figure 3:
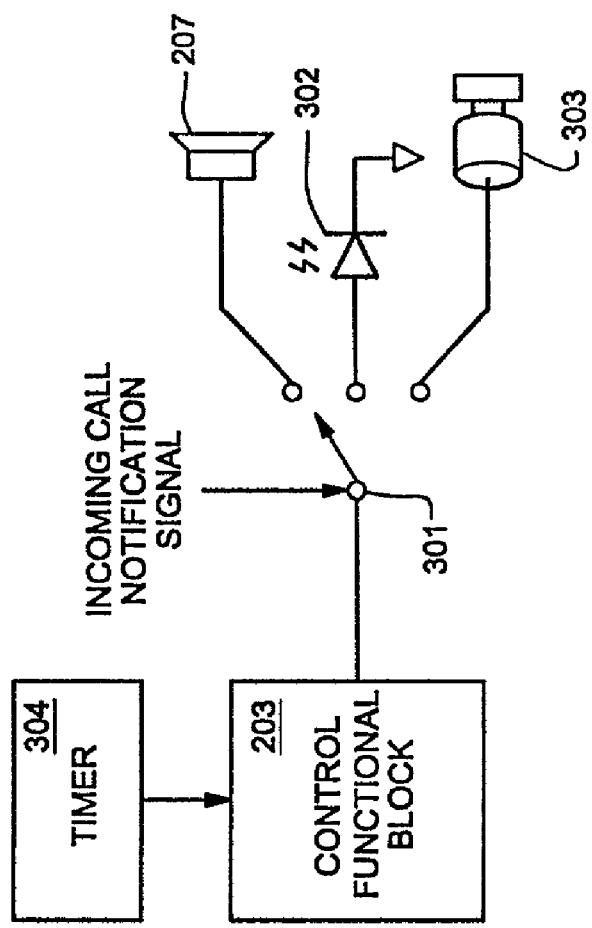
FIG. 3 shows a circuit diagram for temporarily disabling a cell phone's audio alarm.

FIG. 3 shows a circuit diagram for temporarily disabling a cell phone's audio alarm. The control functional block 203 normally commands switch 301 to enable the speaker 207 for sounding an audible alarm whenever an incoming call notification signal is generated. However, if a code for a silent mode of operation is received by the cell phone, the control functional block 203 commands switch 301 to disable the speaker 207 for purposes of incoming call notification. Instead, switch 301 turns on a light source, such a blinking light emitting diode (LED). Alternatively, switch 301 can turn on a vibration unit, such as a motor 303 which drives an unbalanced load. Switch 301 can be controlled to maintain the silent mode of operation for as long as the cell phone continues to receive the silent mode signal code. In another embodiment, switch 301 can be controlled to maintain the silent mode of operation for a fixed duration, as indicated by timer 304. In one embodiment, the cell phone has an override switch which enables the user to place their cell phone in a permanent audio alarm mode, even in the event of receiving a non-audible code.

Figure 4:
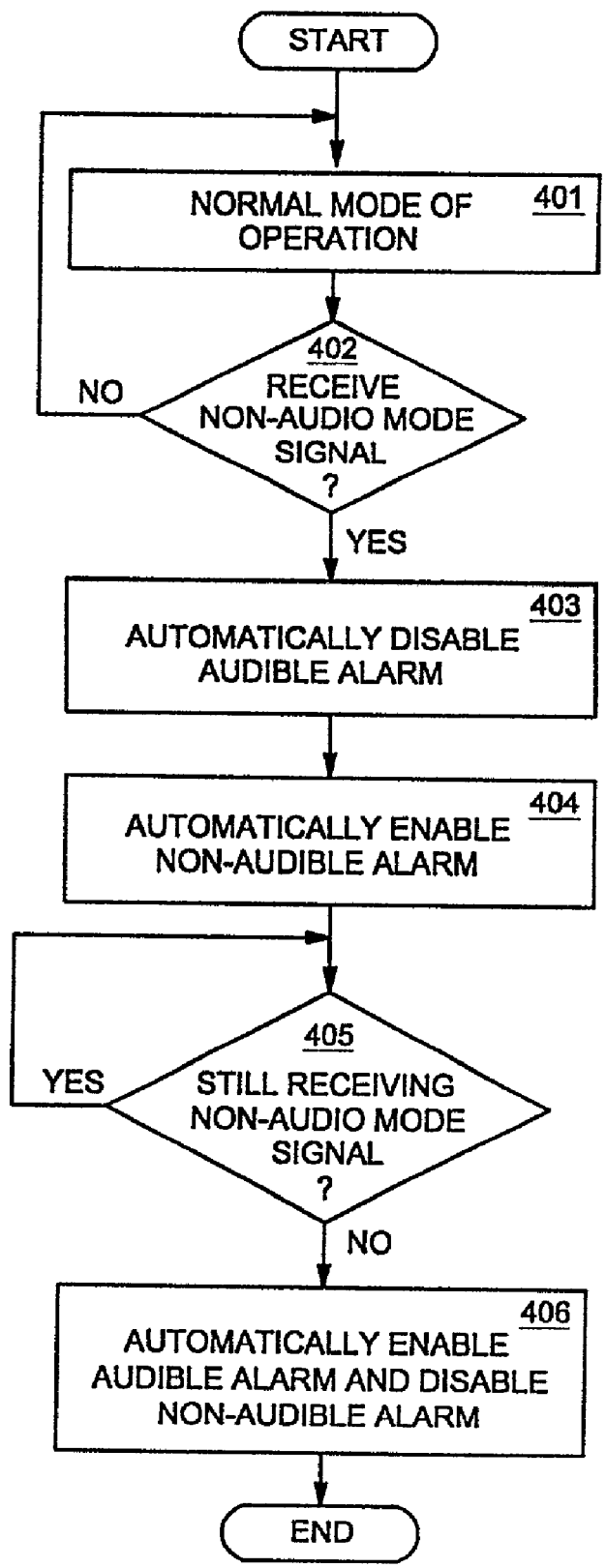
FIG. 4 is a flowchart describing the process for a first embodiment of selectively disabling audible cell phone ringing.

FIG. 4 is a flowchart describing the process for one embodiment of selectively disabling audible cell phone ringing. Initially, the cell phone is in a normal mode of operation, step 401. In this mode, the cell phone rings whenever it receives an incoming call. However, if a non-audible mode signal is received, step 402, the cell phone is automatically placed in a non-audible mode or control. This entails automatically disabling the audible alarm, step 403, and automatically enabling one or more non-audible alarm(s), such as a blinking light or activating a vibration unit, step 404. The silent mode of operation continues for as long as the cell phone receives the non-audible mode signal, step 405. If the cell phone no longer receives the non-audible mode signal (either the cell phone has moved away from the range of the non-audible signal transmitter; the user has over-ridden the non-audible signal; or the non-audible signal is no longer being transmitted), the cell phone is automatically placed back in its normal mode of operation. This entails automatically enabling the audible alarm and automatically disabling the non-audible alarm, step 406.

Figure 5:
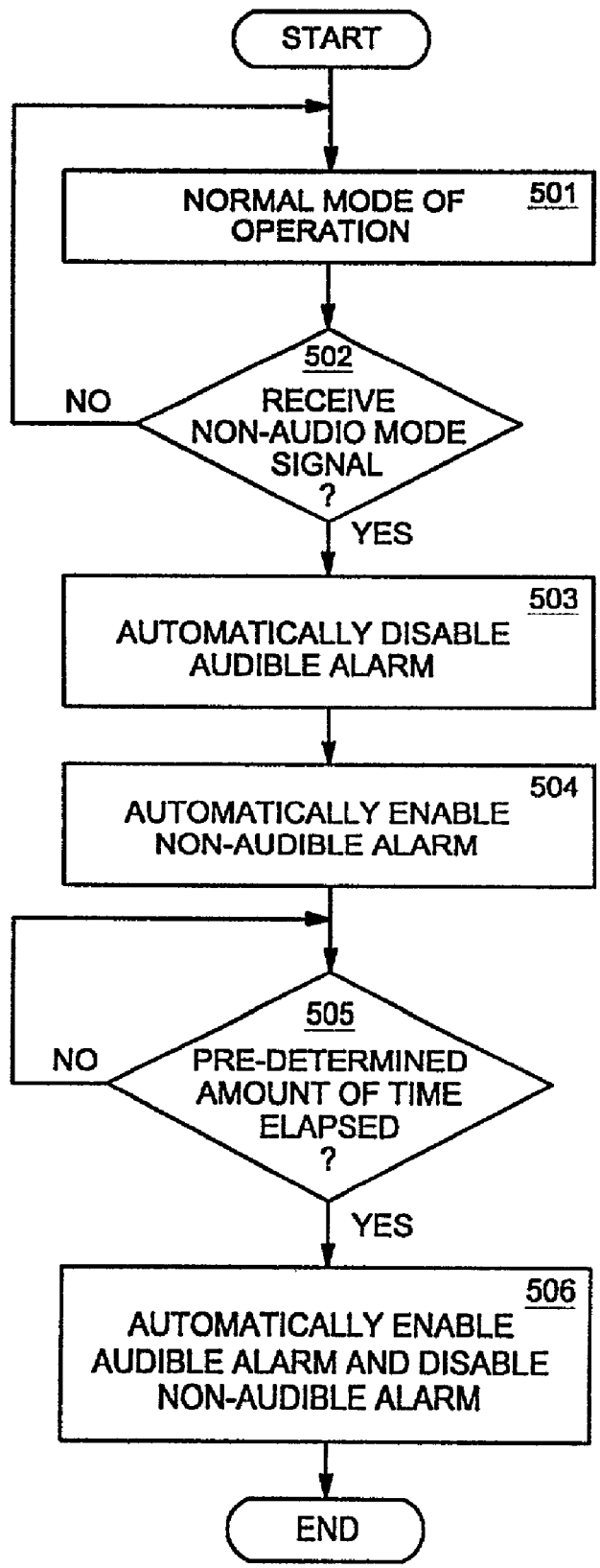
FIG. 5 is a flowchart describing the process for a second embodiment of selectively disabling audible cell phone ringing.

FIG. 5 is a flowchart describing the process for another embodiment of selectively disabling audible cell phone ringing. Initially, the cell phone is in a normal mode of operation, step 501. In this mode, the cell phone rings whenever it receives an incoming call. However, if a non-audible mode signal is received, step 502, the cell phone is automatically placed in a non-audible mode or control. This entails automatically disabling the audible alarm, step 503, and automatically enabling one or more non-audible alarm(s), such as a blinking light or activating a vibration unit, step 504. The silent mode of operation continues for a fixed, pre-determined amount of time, step 505. Once this time has elapsed, the cell phone is automatically placed back in its normal mode of operation. This entails automatically enabling the audible alarm and automatically disabling the non-audible alarm, step 506.

It should be noted that although the description above has been in reference to cell phones, the present invention can also be applied to selectively disable annoying pager ringing as well. A transmitting system can be designed to transmit a special code over-the-air. Any pagers receiving this special code can be automatically switched to a non-audible alarm mechanism. Rather than beeping, the pager would have a blinking light or would vibrate to notify the user that it has received an incoming page. The cell phone can continue to function in a non-audible mode or control for as long as it is in receipt of the RF code or for a fixed duration. Any and all embodiments described above with respect to cell phones can equally apply to pagers as well.

Therefore, the preferred embodiment of the present invention of an apparatus and method for selectively disabling cell phone and/or pager ringing is thus described. While the present invention has been described in particular embodiments, it should be appreciated that the present invention should not be construed as limited by such embodiments, but rather construed according to the below claims.

What is claimed is:

1. A method for automatically disabling an audible alarm in a cell phone, comprising:
   providing a mobile radio frequency (RF) transmitter that can be unobtrusively mounted in a setting, said mobile RF transmitter having no RF receiver functionality;
   transmitting a non-audible control signal as a directional RF signal from said mobile RF transmitter;
   determining whether the cell phone has received the non-audible control signal;
   automatically disabling the audible alarm when the non-audible mode or control signal is received;
   automatically enabling a non-audible alarm to notify a user of an incoming call when the non-audible control signal is received;
   disabling the audible alarm and activating the non-audible alarm for a fixed, pre-determined amount of time after the cell phone receives the directional RF signal; and
   automatically reactivating the audible alarm and disabling the non-audible alarm after the fixed, pre-determined amount of time has elapsed.

2. The method of claim 1 further comprising:
   activating a blinking light to notify the user of the incoming call when the non-audible control signal is received.

3. The method of claim 1 further comprising:
   activating a vibration unit to notify the user of the incoming call when the non-audible control signal is received.

4. The method of claim 1 further comprising:
   over-riding the non-audible control signal.

5. The method of claim 1 wherein the directional RF signal comprises:
   a signal for automatically disabling the audible alarm and activating the non-audible alarm when the cell phone receives the directional RF signal broadcasting a quiet mode of operation signal.

6. The method of claim 1 wherein the directional RF signal comprises:
   a signal for automatically reactivating the audible alarm and disabling the non-audible alarm when the cell phone receives the directional RF signal broadcasting a normal mode of operation signal.

7. An apparatus for automatically disabling an audible alarm in a cell phone, comprising:
   a receiver for receiving a non-audible mode signal from a mobile RF transmitter that can be unobtrusively mounted in a setting, said mobile RF transmitter having no RF receiver functionality, which broadcasts a directional non-audible mode signal;
   a speaker coupled to the receiver which generates an audible sound to notify a user of an incoming call;
   a processor coupled to the speaker which automatically disables an audible alarm when the non-audible mode signal is received and which automatically enables a non-audible alarm to notify a user of any incoming calls when the non-audible mode signal is received;
   wherein the processor disables the audible alarm and activates the non-audible alarm for a fixed, pre-determined amount of time after receiving the directional RF signal; and
   wherein the processor automatically reactivates the audible alarm and disables the non-audible alarm after the fixed, pre-determined amount of time has elapsed.

8. The apparatus of claim 7 wherein the processor activates a blinking light to notify the user of the incoming call when the non-audible control signal is received.

9. The apparatus of claim 7 wherein the processor activates a vibration unit to notify the user of the incoming call when the non-audible control signal is received.

10. The apparatus of claim 7 further comprising an over-ride switch to over-ride the non-audible control signal.

11. The apparatus of claim 7 wherein the processor automatically disables the audible alarm and activates the non-audible alarm when the cell phone receives the directional RF signal broadcasting a quiet mode of operation signal.

12. The apparatus of claim 7 wherein the processor automatically reactivates the audible alarm and disables the non-audible alarm when the cell phone receives the directional RF signal broadcasting a normal mode of operation signal.

* * * * *